(12) United States Patent
Sterling et al.

(10) Patent No.: US 9,329,901 B2
(45) Date of Patent: May 3, 2016

(54) RESOURCE HEALTH BASED SCHEDULING OF WORKLOAD TASKS

(75) Inventors: David Andrew Sterling, Apex, NC (US); Victor Boctor, Redmond, WA (US); Siddhartha Mathur, Sammamish, WA (US); Ozan Ozhan, Kirkland, WA (US); Vitali V. Prokopenko, Issaquah, WA (US); David Nunez Tejerina, Bellevue, WA (US); Selim Yazicioglu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

(21) Appl. No.: 13/315,382

(22) Filed: Dec. 9, 2011

(65) Prior Publication Data

US 2013/0152097 A1    Jun. 13, 2013

(51) Int. Cl.
*G06F 9/46* (2006.01)
*G06F 9/50* (2006.01)

(52) U.S. Cl.
CPC ........ *G06F 9/505* (2013.01); *G06F 2209/5021* (2013.01); *G06F 2209/5022* (2013.01)

(58) Field of Classification Search
None
See application file for complete search history.

(56) References Cited

U.S. PATENT DOCUMENTS

| | | | | |
|---|---|---|---|---|
| 4,642,756 A | * | 2/1987 | Sherrod | 718/103 |
| 5,109,512 A | * | 4/1992 | Bahr et al. | 718/103 |
| 5,375,244 A | | 12/1994 | McNair | |
| 5,515,538 A | * | 5/1996 | Kleiman | 710/260 |
| 5,774,718 A | * | 6/1998 | Aoshima et al. | 718/100 |
| 6,477,561 B1 | * | 11/2002 | Robsman | 718/105 |
| 6,701,311 B2 | | 3/2004 | Biebesheimer et al. | |
| 6,754,664 B1 | | 6/2004 | Bush | |
| 6,829,713 B2 | | 12/2004 | Cooper et al. | |
| 7,165,088 B2 | | 1/2007 | Cohen et al. | |
| 7,206,845 B2 | | 4/2007 | Banning et al. | |
| 7,254,607 B2 | | 8/2007 | Hubbard et al. | |
| 7,353,538 B2 | | 4/2008 | Sample | |
| 7,783,666 B1 | | 8/2010 | Zhuge et al. | |
| 7,802,238 B2 | | 9/2010 | Clinton | |
| 7,840,647 B2 | | 11/2010 | Kloba et al. | |
| 8,103,769 B1 | | 1/2012 | Weiser et al. | |
| 8,112,768 B2 | | 2/2012 | Wu | |

(Continued)

OTHER PUBLICATIONS

Cobb, Michael, "Using Resource Allocation Management to Prevent DOS and other Attacks", Retrieved at searchsecurity.techtarget.co.uk/tip/0,289483,sid180_gci1507648,00.html>>, Mar. 31, 2010, pp. 16.

(Continued)

*Primary Examiner* — Wissam Rashid
(74) *Attorney, Agent, or Firm* — Damon Rieth; Tom Wong; Micky Minhas

(57) ABSTRACT

A computer-implemented method for allocating threads includes: receiving a registration of a workload, the registration including a workload classification and a workload priority; monitoring statuses of a plurality of resources; identifying, by a computing device, a thread of a resource from the plurality of resources, the thread being programmed to execute a task associated with the workload; evaluating, by the computing device, the workload classification and the workload priority of the workload with workload classifications and workload priorities of other workloads requesting the thread; and allocating the thread to one of the workloads based on evaluation of the workload classification and the workload priority.

20 Claims, 5 Drawing Sheets

(56) References Cited

U.S. PATENT DOCUMENTS

| | | | |
|---|---|---|---|
| 8,190,593 | B1 | 5/2012 | Dean |
| 8,250,196 | B2 | 8/2012 | Demir et al. |
| 8,312,073 | B2 | 11/2012 | Jakobsson |
| 8,468,251 | B1 | 6/2013 | Pijewski et al. |
| 2002/0138643 | A1 | 9/2002 | Shin et al. |
| 2006/0090163 | A1 | 4/2006 | Karisson et al. |
| 2006/0135258 | A1 | 6/2006 | Maheshwari et al. |
| 2006/0190482 | A1 | 8/2006 | Kishan et al. |
| 2006/0294228 | A1 | 12/2006 | Almstrom |
| 2007/0118653 | A1* | 5/2007 | Bindal .......... 709/226 |
| 2007/0233693 | A1 | 10/2007 | Baxter et al. |
| 2007/0233694 | A1 | 10/2007 | Baxter |
| 2007/0234327 | A1 | 10/2007 | Baxter et al. |
| 2008/0120620 | A1 | 5/2008 | Lett et al. |
| 2008/0240144 | A1 | 10/2008 | Kruse et al. |
| 2009/0055829 | A1 | 2/2009 | Gibson |
| 2009/0100435 | A1 | 4/2009 | Papaefstathiou et al. |
| 2009/0172191 | A1 | 7/2009 | Dumitriu et al. |
| 2010/0043004 | A1 | 2/2010 | Tambi et al. |
| 2010/0205607 | A1 | 8/2010 | Shivanna et al. |
| 2010/0268798 | A1 | 10/2010 | Kourkouzelis et al. |
| 2011/0087776 | A1 | 4/2011 | Tabone et al. |
| 2011/0153828 | A1 | 6/2011 | Park et al. |
| 2011/0161488 | A1 | 6/2011 | Anderson et al. |
| 2011/0161964 | A1 | 6/2011 | Piazza et al. |
| 2011/0173038 | A1 | 7/2011 | Moon et al. |
| 2012/0030339 | A1 | 2/2012 | Dumitriu et al. |
| 2012/0110572 | A1 | 5/2012 | Kodi et al. |
| 2012/0143992 | A1 | 6/2012 | Salamatov et al. |
| 2012/0174121 | A1 | 7/2012 | Treat et al. |
| 2013/0152097 | A1 | 6/2013 | Boctor et al. |
| 2013/0185427 | A1 | 7/2013 | Sterling et al. |

OTHER PUBLICATIONS

Osborn, Stu, "Determining Health and Wellness of an OCS Deployment—IM and Presence", Retrieved at blogs.technet.com/b/nexthop/archive/2008/07/28/determining-health-and-wellness-of-an-ocs-deployment-im-andpresence.aspx>>, Jul. 2008, pp. 5.

"How BizTalk Server Implements Host Throttling", Retrieved at //msdn.microsoft.com/en-us/library/aa559893(v=BTS.70).aspx>>, Retrieved Date: Oct. 19, 2011, pp. 13.

Anderson, et al., "Insider Attack and Real-Time Data Mining of User Behavior", Retrieved at //ieeexplore.ieee.org/stamp/stamp.jsp?tp=8,arnumber=5388654>>, Proceedings of IBM Journal of Research and Development, vol. 51, No. 3/4, May/Jul. 2007, pp. 465-475.

"Determining Health and Wellness of an OCS Deployment", Microsoft Office Communications Server blog published Jul. 24, 2008, 5 Pages.

"How BizTalk Server Implements Host Throttling", Copyright Date 2010, 7 Pages.

Cobb, Michael; "Using Resource Allocation Management to Prevent DOS and Other Attacks", published Mar. 10, 2010, 3 Pages.

Grimm, et al., "Na Kika Secure Service Execution and Composition in an Open Edge-Side Computing Network", Retrieved at <<http://static.usenix.org/event/nsdi06/tech/full_papers/grimm/grimm.pdf>>, in the Proceedings of the 3rd Symposium on Networked Systems Design and Implementation (NSDI '06), May 8, 2006, 14 Pages.

"What's Behind Network Downtime", Retrieved at 935.ibm.com/services/sg/gts/pdf/200249.pdf>>, May 2008, 12 Pages.

"New-Workflow-MakeItEasy Authoring Workflows using PowerShell Extended Syntax", Retrieved at ://roualin.fr/new-workflow-makeiteasy-authoring-workftows-using-powershell-extended-syntax-2/>>, Jul. 21, 2012, 6 Pages.

Mathur, et al., "Identifying and Throttling Tasks Based on Task Interactivity" U.S. Appl. No. 13/736,080, filed Jan. 8, 2013, 52 Pages.

Office Action, U.S. Appl. No. 12/958,134, filed Dec. 1, 2010, Office Action Notification Date: Jul. 11, 2013, 15 Pages.

Office Action, U.S. Appl. No. 12/958,134, filed Dec. 1, 2010, Office Action Notification Date: Nov. 13, 2013, 15 Pages.

Office Action, U.S. Appl. No. 12/958,134, filed Dec. 1, 2010, Office Action Notification Date: Mar. 20, 2014, 21 Pages.

IBM-Tivoli-Workload-Automation accessed at: 01.ibm.com/software/tivoli/products/workloadautomation/features.html; accessed on: Sep. 27, 2011, 2 pages.

Office Action, U.S. Appl. No. 12/958,134, filed Dec. 1, 2010, Office Action Notification Date: Jul. 9, 2014, 17 Pages.

Office Action, U.S. Appl. No. 13/736,080, filed Jan. 8, 2013, Office Action Notification Date: Jan. 15, 2015, 12 Pages.

Office Action, U.S. Appl. No. 13/350,827, filed Jan. 16, 2012, Office Action Notification Date: Mar. 16, 2015, 8 Pages.

Office Action, U.S. Appl. No. 13/350,827, filed Jan. 16, 2012, Office Action Notification Date: Sep. 12, 2014, 12 Pages.

Office Action, U.S. Appl. No. 13/736,080, filed Jan. 8, 2013, Office Action Notification Date: Oct. 2, 2014, 31 Pages.

Office Action, U.S. Appl. No. 13/350,827, filing date Jan. 16, 2012, Office Action Notification Date: Jul. 29, 2015, 6 Pages.

* cited by examiner

RESOURCE HEALTH BASED SCHEDULING OF WORKLOAD TASKS

BACKGROUND

A data center is a facility that houses computer systems and associated components. Continuity, stability, and reliability are of concern when a particular enterprise or organization relies on at least one data center to supply computing services to customers. If a system becomes unavailable, the services may be impaired or stopped completely. This can negatively impact user quality of experience and perception of the organization.

SUMMARY

In one aspect, a computer-implemented method for allocating threads includes: receiving a registration of a workload, the registration including a workload classification and a workload priority; monitoring statuses of a plurality of resources; identifying, by a computing device, a thread of a resource from the plurality of resources, the thread being programmed to execute a task associated with the workload; evaluating, by the computing device, the workload classification and the workload priority of the workload with workload classifications and workload priorities of other workloads requesting the thread; and allocating the thread to one of the workloads based on evaluation of the workload classification and the workload priority.

In another aspect, a computing device includes: a processing unit; and a system memory connected to the processing unit, the system memory including instructions that, when executed by the processing unit, cause the processing unit to create: a workload classification module programmed to determine a workload classification and a workload priority for a plurality of workloads; a thread pool module programmed to run tasks based on a health status of a plurality of resources, and to identify one or more threads running tasks impacting a plurality of resources; a resource health module programmed to determine a health state of a resource, at least in part, on the workload classification and the workload priority; and a resource monitor module programmed to allocate one of a plurality of threads to one of the workloads based on evaluation of the health state of the resources.

In yet another aspect, a computer-readable storage medium has computer-executable instructions that, when executed by a computing device, cause the computing device to perform steps comprising: receiving a registration of a workload; configuring a workload classification and a workload priority of the workload using an administrative interface, wherein the workload classification is one of internal and external; monitoring statuses of a plurality of resources; identifying a thread of a resource from the plurality of resources, the thread being programmed to execute a task associated with the workload; evaluating the workload classification and the workload priority of the workload with workload classifications and workload priorities of other workloads requesting the resource; allocating the thread to one of the workloads based on evaluation of the workload classification and the workload priority, wherein the allocating selects a preferred thread allocation when workload priorities are dissimilar; throttling the workload when the resource is overloaded; and re-allocating the thread for the workload when the resource recovers from overloading.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DETAILED DESCRIPTION

The present disclosure is directed towards systems and methods for resource health based scheduling of workload tasks in a networked computing environment. In example embodiments, this can be achieved by scheduling and running recurring and opportunistic discretionary workloads when resources are idle, and by prioritizing, slowing down or stopping such workloads when resources are under pressure. Although not so limited, an appreciation of the various aspects of the present disclosure will be gained through a discussion of the examples provided below.

Figure 1:
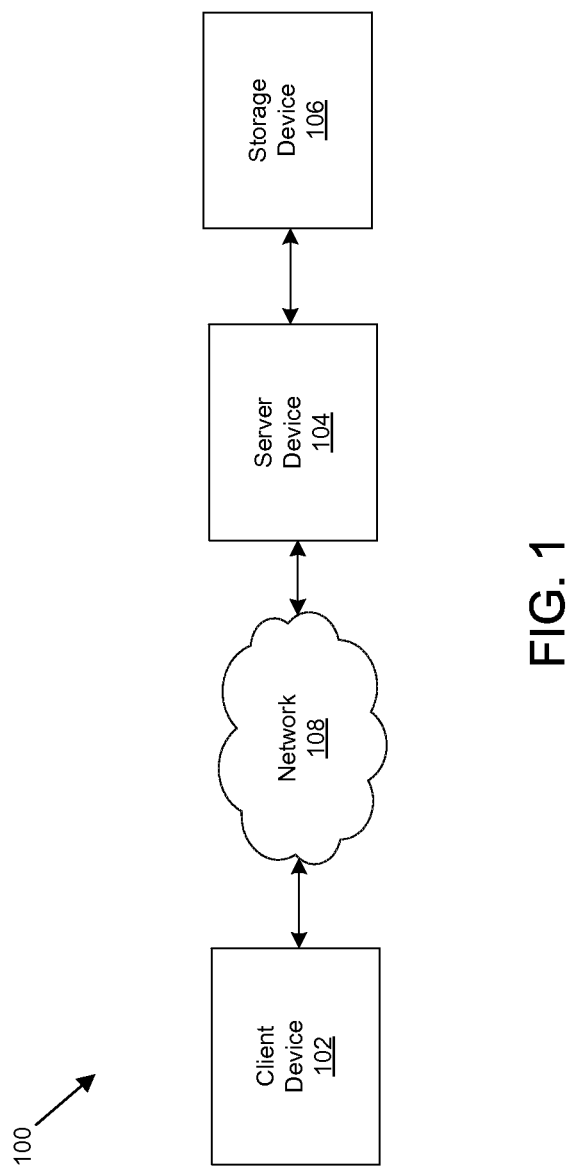
FIG. 1 shows an example networked computing environment.

Referring now to FIG. 1, an example networked computing environment 100 is shown in which aspects of the present disclosure may be implemented. The networked computing environment 100 includes a client device 102, a server device 104, a storage device 106, and a network 108. Other embodiments are possible. For example, the networked computing environment 100 may generally include more or fewer devices, networks, and/or other components as desired.

The client device 102 and the server device 104 are computing devices, described in further detail below in connection with FIG. 2. In example embodiments, the client device 102 is configured for accessing and interacting with business processes implemented by the server device 104. Example business processes include messaging and communications process, collaboration processes, data management processes, and others. Exchange Server, from Microsoft Corporation of Redmond, Wash., is an example of a business server that implements messaging and communications business processes in support of electronic mail, calendaring, and contacts and tasks features, in support of mobile and web-based access to information, and in support of data storage. Other embodiments are possible.

In some embodiments, the server device 104 includes of a plurality of interconnected, networked server devices operating together to share resources, software, and information. In such a scenario, the networked devices provide a "cloud" computing platform in which one or more applications and data are hosted for one or more clients connected to the cloud computing platform. Still other embodiments are possible.

The storage device 106 is an electronic data storage device, such as a relational database or any other type of persistent data storage device. The storage device 106 stores data in a predefined format such that the server device 104 can query, modify, and manage data stored thereon. Example data includes information related to directory services, authentication services, administration services, and other services such as managed by the ACTIVE DIRECTORY® directory service from Microsoft Corporation. Other embodiments are possible.

The network 108 is a bi-directional data communication path for data transfer between one or more devices. In the example shown, the network 108 establishes a communication path for data transfer between the client device 102 and the server device 104. The network 108 can be of any of a number of wireless or hardwired WAN, LAN, Internet, Intranet, or other packet-based communication networks such that data can be transferred among the elements of the example networked computing environment 100.

Figure 2:
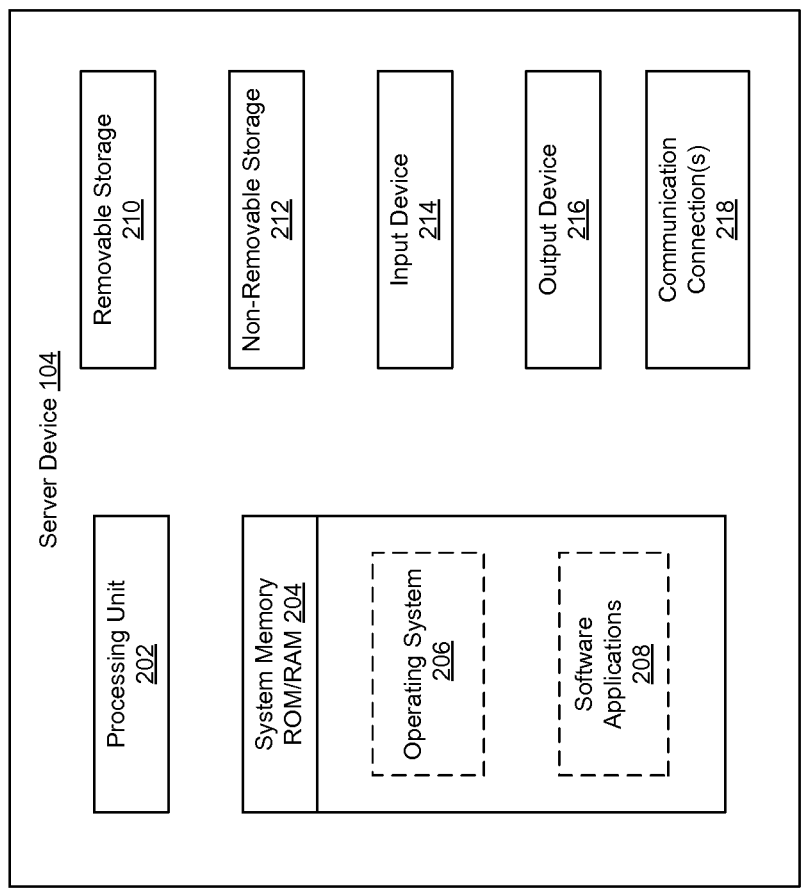
FIG. 2 shows the example server device of FIG. 1 in detail.

Referring now to FIG. 2, the server device 104 of FIG. 1 is shown in detail. As mentioned above, the server device 104 is a computing device. An example computing device includes a server computer, desktop computer, laptop computer, personal data assistant, smartphone, gaming console, and others.

The server device 104 includes at least one processing unit 202 (sometimes referred to as a processor) and a system memory 204. The system memory 204 stores an operating system 206 for controlling the operation of the server device 104 or another computing device. One example operating system is the WINDOWS® operating system from Microsoft Corporation. Other embodiments are possible.

The system memory 204 includes one or more software applications 208 and may include program data. Software applications 208 may include many different types of single and multiple-functionality programs, such as a server program, an electronic mail program, a calendaring program, an Internet browsing program, a spreadsheet program, a program to track and report information, a word processing program, and many others. One example program is the Office suite of business applications from Microsoft Corporation. Another example program includes SHAREPOINT® collaboration server or Exchange Server, also from Microsoft Corporation of Redmond, Wash. Still other programs are possible.

The system memory 204 is computer-readable media. Examples of computer-readable media include computer-readable storage media and communication media. Computer-readable storage media is physical media that is distinguished from communication media.

The phrase "computer-readable" generally refers to information that can be interpreted and acted on by a computing device. The phrase "storage media" or, equivalently, "storage medium" refers to the various types of physical or tangible material on which electronic data bits are written and stored. Since it is not possible to store information in a transient signal, "computer-readable storage media" as defined within the context of the present disclosure excludes transient signals.

Computer-readable storage media includes physical volatile and nonvolatile, removable and non-removable media implemented in any method or technology for storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the server device 104. Any such computer storage media may be part of or external to the server device 104. Such storage is illustrated in FIG. 2 by removable storage 210 and non-removable storage 212.

Communication media is typically embodied by computer-readable instructions, data structures, program modules, or other data, in a transient modulated data signal, such as a carrier wave or other transport mechanism, and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 104 also includes any number and type of an input device 214 and an output device 216. An example input device 214 includes a keyboard, mouse, pen, voice input device, touch input device, motion input device, and others. For example, the input device 214 may be a camera operative to capture and record motions and/or gestures made by a user. The input device 214 may be further operative to capture words spoken by a user, such as by a microphone, and/or capture other inputs from user such as by a keyboard and/or mouse.

Consistent with embodiments of the present disclosure, the input device 214 may comprise any motion detection device capable of detecting the movement of a user. For example, the input device 214 may comprise a KINECT® motion capture device, from Microsoft Corporation. Other embodiments are possible.

An example output device 216 includes a display, speakers, printer, and others. The server device 104 also includes a communication connection 218 configured to enable communications with other computing devices over a network (e.g., network 108 of FIG. 1) in a distributed computing system environment.

Figure 3:
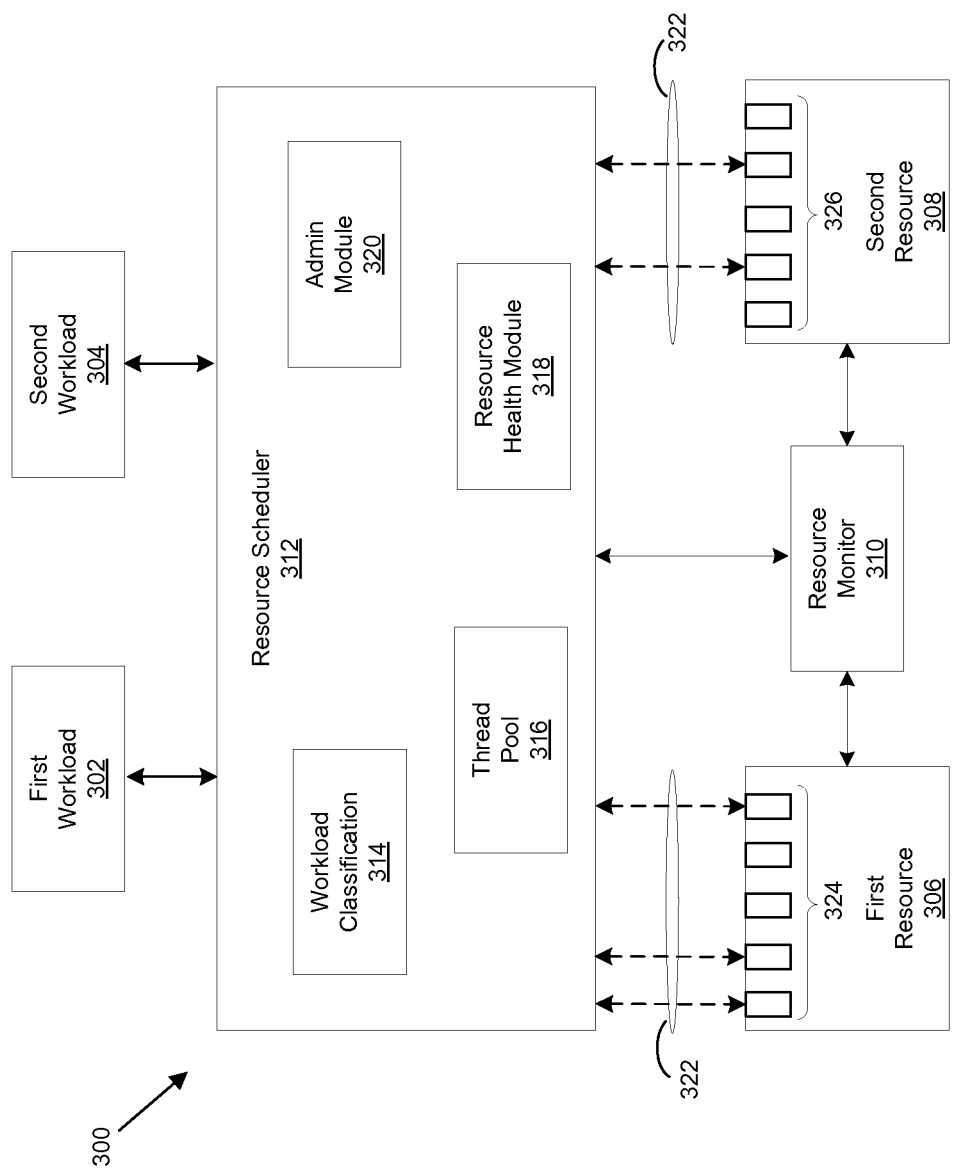
FIG. 3 shows an example environment configured and arranged to implement resource health based scheduling of workload tasks in accordance with the present disclosure.

Referring now to FIG. 3, an example environment 300 configured and arranged to implement resource health based scheduling of workload tasks is shown. In one embodiment, respective components of the environment 300 are implemented as logical modules of software executing on the server device 104, as described above in connection with FIGS. 1 and 2. However, other embodiments are possible. For example, one or more components of the environment 300 may be located wholly or in part on one or more different networked computing devices in a cloud computing implementation. Still other embodiments are possible.

The environment 300 includes a first workload 302, a second workload 304, a first resource 306, a second resource 308, a resource monitor 310, and a resource scheduler 312. The resource scheduler 312 includes a workload classification 314, a thread pool 316, a resource health module 318, and an admin module 320.

Other embodiments are possible. For example, the environment 300 can generally include any number of workloads, resources, and resource monitors as desired. Additionally, the resource scheduler 312 may include more or fewer modules or components configured to implement resource health based scheduling of workload tasks in accordance with the present disclosure.

The first workload 302 and the second workload 304 are pre-registered with the workload classification 314 of the resource scheduler 312. In example embodiments, registration includes specification or definition of at least an associated workload classification. In an Exchange server implementation, a workload classification includes at least an "external" workload classification and an "internal" workload classification. In general, a workload classification may be assigned to a particular workload either by default or manual specification via the admin module 320. Other embodiments are possible.

An external workload classification relates to a software process in which specific tasks are implemented that directly exposes functionality to a user. A workload that renders an e-mail for viewing upon selection of the same by a user is one example of an external workload classification.

An internal workload classification relates to a software process in which specific tasks are implemented that indirectly exposes functionality to a user, or does not expose functionality to a user. A workload that periodically cleans-up a "Deleted Items" mailbox as an automated background process is one example of an internal workload classification. Other embodiments are possible.

In these examples, an external workload classification is assigned a greater importance or workload priority than an internal workload classification, since the former exposes functionality directly to a user. Functionality that is directly exposed to a user can potentially impact user quality of experience and, by extension, perception of an organization associated with a given workload. An external workload classification might therefore be assigned a "High" priority or a "Level 1" priority, whereas an internal workload classification might be assigned a "Medium" priority or a "Level 2" priority in comparison. In general, a workload priority may be assigned either by default or manual specification via the admin module 320. Other embodiments are possible.

In practice, the resource scheduler 312 maintains and monitors a fixed number of threads 322 (e.g., five) within the thread pool 316. The threads 322 are employed to selectively execute or implement specific tasks, as requested by the first workload 302 and second workload 304, against the first resource 306 and/or the second resource 308. Each of the threads 322 is configured to access the first resource 306 and/or the second resource 308 via any of a first plurality of concurrency slots 324 of the first resource 306, and a second plurality of concurrency slots 326 of the second resource 308. In general, the first resource 306 and the second resource 308 each can include any number of concurrency slots, respectively.

Specific tasks are implemented by each of the threads 322 based on classification of the first workload 302 and second workload 304 (i.e., workload classification and priority), and certain "health parameters" of the first resource 306 and second resource 308 as obtained by the resource monitor 310 and stored in the resource health module 318. When one or more parameters which quantify the "health" of the first resource 306 and second resource 308 lie outside of specified bounds, the number of threads that can potentially be allocated against a particular resource is reduced temporarily following completion of a task.

For example, when the first resource 306 is deemed "unhealthy," the resource scheduler 312 may reduce the number of threads available to the first resource 306 from five (5) to four (4) until the first resource 306 recovers to a "healthy" state. In this manner, the resource scheduler 312 throttles access to the first resource 306 based on the "health" of this resource. Examples of how the health state of a given resource is determined are provided below. The resource scheduler 312 manages or controls thread allocation to the second resource 308 in a similar manner.

Figure 4:
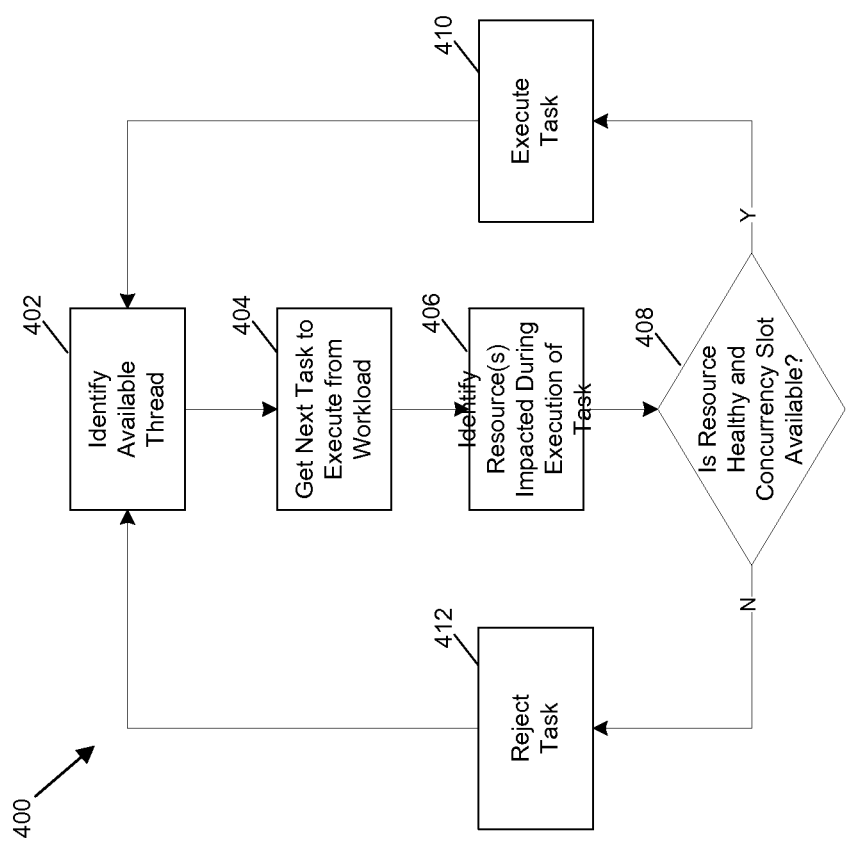
FIG. 4 shows a flowchart for a first example method for selectively allocating a thread to a task against a resource within the environment of FIG. 3.

Referring now additionally to FIG. 4, a first example method 400 for selectively allocating an available one of the threads 322 to execute or implement specific tasks against the first resource 306 and the second resource 308 is shown. It is assumed in this example that the first workload 302 and second workload 304 have a similar workload priority (e.g., "Medium"). However, other embodiments are possible, described in further detail below in connection with FIG. 5.

The method 400 begins at an operation 402. At operation 402, the resource scheduler 312 determines that one of the threads 322 is available to execute or implement at least one specific task against either the first resource 306 or the second resource 308. In general, the resource scheduler 312 monitors and evaluates the status of each of the threads 322 within the thread pool 316. When a particular one of the threads 322 is no longer utilized, the example method 400 is implemented. Other embodiments are possible.

Operational flow then proceeds to an operation 404. At operation 404, the resource scheduler 312 selects and/or acquires at least one pending task from the first workload 302. In the example embodiment, the resource scheduler 312 maintains a historical log of thread allocation and determines which one of the first workload 302 and the second workload 304 was most recently and previously selected. In this manner, tasks are selected by the resource scheduler 312 from the first workload 302 and the second workload 304 in a "round-robin" fashion. Other embodiments are possible.

Operational flow then proceeds to an operation 406. At operation 406, the resource scheduler 312 evaluates the task acquired at operation 404 and determines that the first resource 306 is impacted during execution of the task. An example task includes rendering an e-mail to a user upon selection of the same. In this example, the first resource 306 may store and/or have access to data required to render the e-mail. Other embodiments are possible.

Operational flow then proceeds to an operation 408. At operation 408, the resource scheduler 312 queries the resource health module 318 to determine whether the first resource 306 is "healthy" enough to have the task executed against the same, and also determines whether a slot of the first plurality of concurrency slots 324 is available.

For example, the first resource 306 may be deemed "healthy" if current average latency associated with rendering an e-mail is less than 1 millisecond. In contrast, the first resource 306 may be deemed "unhealthy" if current average latency associated with rendering an e-mail is greater than or equal to 1 millisecond. In general, any perceivable metric or parameter (e.g., memory usage, bandwidth usage, process latency, etc.) associated with the first resource 306 may be evaluated to determine the "health" of the first resource 306.

Additional factors such as workload classification and workload priority of the first workload 302 can also be used to determine a threshold related to the "health" of the first resource 306. For example, the first resource 306 may be allowed to reach 90% CPU usage before the first resource 306 is evaluated as "unhealthy" when the first workload 302 is defined as a "High" priority workload. In contrast, the first resource 306 may be allowed to reach 40% CPU usage before the first resource 306 is evaluated as "unhealthy" when the first workload 302 is defined as a "Low" priority workload. In example embodiments, the relative "health" of a resource required to implement a particular task or workload may be selectively defined via the admin module 320. Other embodiments are possible.

When both of the conditions at operation 408 are met, operational flow branches to an operation 410. When both of the conditions at operation 408 are not met, operational flow branches to an operation 412. At operation 410, the resource scheduler 312 allocates the available thread to an available one of the first plurality of concurrency slot 326 such that the task may be executed. Then, upon completion of the task, operational flow returns to operation 402. At operation 412, the resource scheduler 312 rejects the task, and then operational flow returns to operation 402. When the "round robin" as implemented by the example method 400 returns to the first workload 302, the rejected task is once more selected at operation 404. Other embodiments are possible.

Figure 5:
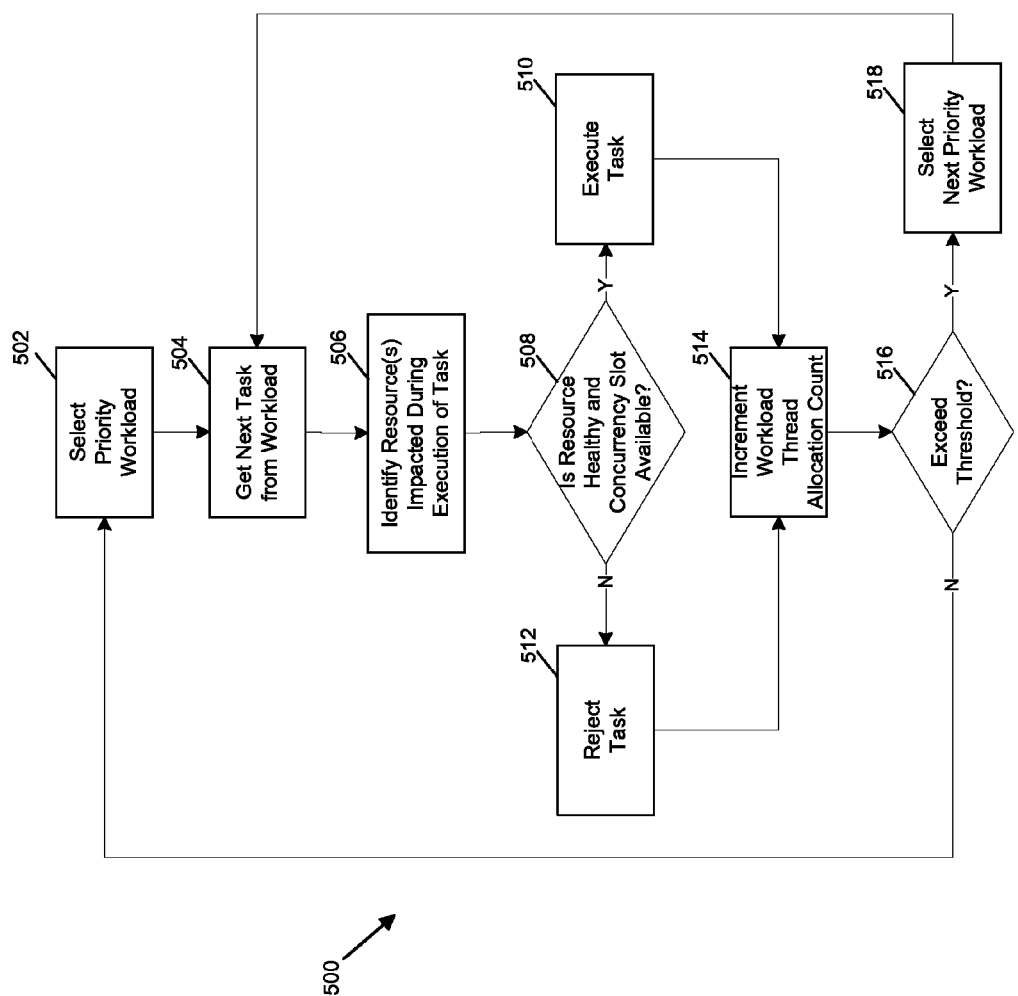
FIG. 5 shows a flowchart for a second example method for selectively allocating a thread to a task against a resource within the environment of FIG. 3.

Referring now to FIG. 5, a second example method 500 for selectively allocating an available one of the threads 322 to execute or implement specific tasks against the first resource 306 and the second resource 308 is shown. It is assumed in this example that the first workload 302 is an "external" workload classification and the second workload 304 is an "internal" workload classification. The first workload 302 might therefore be assigned a "High" priority or a "Level 1" priority, whereas the second workload 304 might be assigned a "Low" priority or a "Level 3" priority in comparison. Other embodiments are possible.

The method 500 begins at an operation 502. At operation 502, the resource scheduler 312 queries the workload classification 314 and determines that the first workload 302 has a workload priority higher than or greater than the second workload 304. The resource scheduler 312 then selects the first workload 302 for the purpose of allocating a thread of the threads 322 to selectively execute or implement specific tasks against the first resource 306 and/or the second resource 308.

Operational flow then proceeds to an operation 504. At operation 504, the resource scheduler 312 selects and/or acquires at least one pending task from the first workload 302. As mentioned above, the resource scheduler 312 maintains a historical log of thread allocation for each workload within the workload classification 314 and determines which one of the first workload 302 and the second workload 304 was most recently and previously selected. In this manner, tasks are selected by the resource scheduler 312 from the first workload 302 and the second workload 304 in a "round-robin" fashion when workloads have a similar workload priority. However, when workloads within the workload classification 314 have a dissimilar priority, the resource scheduler 312 can selectively favor a workload for preferred execution based on at least a corresponding workload priority, as described in further detail below.

Operational flow then proceeds to an operation 506. At operation 506, the resource scheduler 312 evaluates the task acquired at operation 504 and determines that the second resource 308 is impacted during execution of the task. Then, at operation 508, the resource scheduler 312 queries the resource health module 318 to determine whether the second resource 308 is "healthy" enough to have the task executed against the same, and also determines whether a slot of the second plurality of concurrency slots 326 is available.

When both of the conditions at operation 508 are met, operational flow branches to an operation 510. When both of the conditions at operation 508 are not met, operational flow branches to an operation 512. At operation 510, the resource scheduler 312 allocates the available thread to an available one of the second plurality of concurrency slots 326 such that the task may be executed. At operation 512, the resource scheduler 312 rejects the task.

Following either one of operation 510 and operation 512, operational flow proceeds to operation 514. At operation 514, the resource scheduler 312 increments a thread allocation count parameter assigned to the first workload 302. The thread allocation count parameter quantifies how many previous and consecutive times the resource scheduler 312 has selected the first workload 302 at operation 502.

Operational flow then proceeds to an operation 516. At operation 516, the resource scheduler 312 determines whether the current thread allocation count parameter exceeds a predetermined threshold value (e.g., three, four, etc.). When the current thread allocation count parameter does not exceed the predetermined threshold value, operational flow branches to operation 502. When the current thread allocation count parameter does exceed the predetermined threshold value, operational flow branches to operation 518.

At operation 518, the resource scheduler 312 queries the workload classification 314 and determines that the second workload 304 is the lesser priority workload in comparison to the first workload 302, and then selects the second workload 304 for the purpose of allocating a thread of the threads 322 to selectively execute or implement specific tasks against the first resource 306 and/or the second resource 308. Operational flow then returns to operation 504 where the resource scheduler 312 selects and/or acquires at least one pending task from the second workload 304. In this manner, the resource scheduler 312 selects a workload for preferred execution based on at least a corresponding workload priority. Other embodiments are possible.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, embodiments of the present disclosure may be practiced via a system-on-a-chip (SOC) where each or many of the components illustrated in FIG. 2 may be integrated onto a single integrated circuit. Such an SOC device may include one or more processing units, graphics units, communication units, system virtualization units and application functionality, all of which are integrated onto a chip substrate as a single integrated circuit.

Additionally, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for allocating threads, the method comprising:
   maintaining a computer-readable registration of a first computer-executable workload, the registration of the first workload including a first workload classification, the first workload classification yielding a first workload priority level for the first workload;
   maintaining a computer-readable registration of a second computer-executable workload, the registration of the second workload including a second workload classification, the second workload classification yielding a second workload priority level for the second workload that is different from the first workload priority level;

monitoring a status of a computer resource, the monitoring of the status comprising determining a health value representing a health status of the resource for performing workload operations; and allocating the computer resource to execute tasks from a plurality of workloads comprising the first workload and the second workload, the allocating comprising requiring the determined health value of the resource to be within a predetermined first value range to process tasks from workloads with the first workload priority level, and requiring the determined health value of the resource to be within a predetermined second value range to process tasks from workloads with the second workload priority level, the first value range being different from the second value range;

wherein the allocating further comprises:

determining that a thread allocation count parameter exceeds a threshold value, wherein the thread allocation count parameter quantifies a number of consecutive times a subject workload has been selected to have a task from the subject workload considered for allocation to one or more computer resources comprising the computer resource; and in response to the determining that the thread allocation count parameter exceeds the threshold, selecting a workload with a lesser priority than the subject workload.

2. The method of claim 1, wherein the first workload classification is internal and the second workload classification is external.

3. The method of claim 2, wherein the first workload classification and the second workload classification are specified by default.

4. The method of claim 1, wherein the allocating is performed in a round-robin fashion when workload priorities are similar.

5. The method of claim 1, wherein the allocating selects a preferred thread allocation when workload priorities are dissimilar.

6. The method of claim 1, further comprising throttling the workload in response to a determination that the resource is overloaded.

7. The method of claim 1, further comprising configuring the workload classification and the workload priority using an administrative interface.

8. The method of claim 1, wherein the first predetermined value range is defined at least in part by a stored first threshold value, and wherein the second predetermined value range is defined at least in part by a stored second threshold value.

9. The method of claim 1, wherein determining the health value comprises determining a first health value representing a health status of the resource at a first time and determining a second health value representing a health status of the resource at a second time, wherein the first health value and the second health value are both values that are within the second value range and outside the first value range, and wherein the allocating comprises:

determining that the determined first health value is outside the first value range;

in response to determining that the first health value is outside the first value range, declining to assign a task from the first workload to the computer resource for execution;

determining that the determined second health value is within the second value range; and in response to determining that the second health value is within the second value range, assigning a task from the second workload to the computer resource for execution.

10. The method of claim 1, wherein the first value range is defined at least in part by a first predetermined threshold value and wherein the second value range is defined at least in part by a second predetermined threshold value that is different from the first threshold value.

11. A computing system, comprising:

at least one processing unit; and at least one system memory connected to the at least one processing unit, the at least one system memory including instructions that, when executed by the at least one processing unit, cause the at least one processing unit to perform acts comprising:

maintaining a computer-readable registration of a first computer-executable workload, the registration of the first workload including a first workload classification, the first workload classification yielding a first workload priority level for the first workload;

maintaining a computer-readable registration of a second computer-executable workload, the registration of the second workload including a second workload classification, the second workload classification yielding a second workload priority level for the second workload that is different from the first workload priority level;

monitoring a status of a computer resource, the monitoring of the status comprising determining a health value representing a health status of the resource for performing workload operations; and allocating the computer resource to execute tasks from a plurality of workloads comprising the first workload and the second workload, the allocating comprising requiring the determined health value of the resource to be within a predetermined first value range to process tasks from workloads with the first workload priority level, and requiring the determined health value of the resource to be within a predetermined second value range to process tasks from workloads with the second workload priority level, the first value range being different from the second value range;

wherein the allocating further comprises:

determining that a thread allocation count parameter exceeds a threshold value, wherein the thread allocation count parameter quantifies a number of consecutive times a subject workload has been selected to have a task from the subject workload considered for allocation to one or more computer resources comprising the computer resource; and in response to the determining that the thread allocation count parameter exceeds the threshold, selecting a workload with a lesser priority than the subject workload.

12. The system of claim 11, wherein the first workload classification is internal and the second workload classification is external.

13. The system of claim 11, wherein the first workload classification and the second workload classification are specified by default.

14. The system of claim 11, wherein the allocating is performed in a round-robin fashion when workload priorities are similar.

15. The system of claim 11, wherein the allocating selects a preferred thread allocation when workload priorities are dissimilar.

16. One or more computer-readable storage media having computer-executable instructions that, when executed by a computing system, cause the computing system to perform acts comprising:
- maintaining a computer-readable registration of a first computer-executable workload, the registration of the first workload including a first workload classification, the first workload classification yielding a first workload priority level for the first workload;
- maintaining a computer-readable registration of a second computer-executable workload, the registration of the second workload including a second workload classification, the second workload classification yielding a second workload priority level for the second workload that is different from the first workload priority level;
- monitoring a status of a computer resource, the monitoring of the status comprising determining a health value representing a health status of the resource for performing workload operations; and
- allocating the computer resource to execute tasks from a plurality of workloads comprising the first workload and the second workload, the allocating comprising requiring the determined health value of the resource to be within a predetermined first value range to process tasks from workloads with the first workload priority level, and requiring the determined health value of the resource to be within a predetermined second value range to process tasks from workloads with the second workload priority level, the first value range being different from the second value range;

wherein the allocating further comprises:
- determining that a thread allocation count parameter exceeds a threshold value, wherein the thread allocation count parameter quantifies a number of consecutive times a subject workload has been selected to have a task from the subject workload considered for allocation to one or more computer resources comprising the computer resource; and
- in response to the determining that the thread allocation count parameter exceeds the threshold, selecting a workload with a lesser priority than the subject workload.

17. The one or more computer-readable storage media of claim 16, wherein the allocating selects a preferred thread allocation when workload priorities are dissimilar.

18. The one or more computer-readable storage media of claim 16, wherein the acts further comprise throttling the workload in response to a determination that the resource is overloaded.

19. The one or more computer-readable storage media of claim 16, wherein the acts further comprise configuring the workload classification and the workload priority using an administrative interface.

20. The one or more computer-readable storage media of claim 16, wherein the first predetermined value range is defined at least in part by a stored first threshold value, and wherein the second predetermined value range is defined at least in part by a stored second threshold value.

* * * * *